US006968279B2

(12) United States Patent
Gfeller et al.

(10) Patent No.: US 6,968,279 B2
(45) Date of Patent: Nov. 22, 2005

(54) APPARATUS AND METHOD FOR DETERMINING A PULSE POSITION FOR A SIGNAL ENCODED BY A PULSE MODULATION

(75) Inventors: Fritz Gfeller, Bonstetten (CH); Walter Hirt, Wettswill (CH)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 09/902,365

(22) Filed: Jul. 10, 2001

(65) Prior Publication Data

US 2002/0017949 A1 Feb. 14, 2002

(30) Foreign Application Priority Data

Jul. 10, 2000 (EP) .............................. 00810601

(51) Int. Cl.[7] ................................ H03K 9/04
(52) U.S. Cl. ...................................... 702/79
(58) Field of Search .................. 702/79, 142; 455/313, 455/423; 370/252, 509, 389, 469, 338; 329/313; 75/245; 365/185; 378/62; 536/131, 49; 128/298; 705/37; 704/2; 361/680; 709/203, 232, 236, 237; 369/30; 375/295, 224; 327/163; 324/166; 364/498

(56) References Cited

U.S. PATENT DOCUMENTS

| 4,384,354 A | * | 5/1983 | Crawford et al. ........... 327/165 |
| 5,325,397 A | * | 6/1994 | Scholz et al. ............... 375/224 |
| 5,566,022 A | | 10/1996 | Segev ........................ 359/172 |
| 5,617,459 A | * | 4/1997 | Makram-Ebeid et al. ..... 378/62 |
| 5,949,775 A | * | 9/1999 | Rautiola et al. ............ 370/338 |
| 5,986,928 A | * | 11/1999 | Engh et al. ............ 365/185.03 |
| 6,430,119 B1 | * | 8/2002 | Okada et al. ............ 369/30.11 |
| 2002/0022480 A1 | * | 2/2002 | Jensen ........................ 455/423 |

FOREIGN PATENT DOCUMENTS

| EP | 0289384 B1 | 5/1992 |
| SU | 822200 B | * 4/1981 |

OTHER PUBLICATIONS

"Design Considerations For Broadband Indoor Infrared Wireless Communication Systems", Pakravan et al., International Journal of Wireless Information Networks, vol. 2, No. 4, 1995.
"Wireless Infrared Communication Links Using Multi-Beam Transmitters And Imaging Receivers", Tang et al., IEEE International Conference on Communications, 1996.
"Angle Diversity For Nondirected Wireless Infrared Communication", Carruthers et al., IEEE Transactions on Communications, 1998.
"Angle Diversity To Combat The Ambient Noise In Indoor Optical Wireless Communication Systems", Valadas et al., International Journal Of Wireless Information Networks, vol. 4, No. 4, 1997.
J. M. Kahn et al., Imaging Diversity Receivers for High-Speed Infrared Wireless Communication, IEEE Communications Magazine, vol. 36, No. 12, Dec. 1998 pp. 88–94.
Q. Lui et al., A Diversity Combined Map Detection Technique for Digital Cellular/Wireless Applications, Vehicular Technology Conference, IEEE, Apr. 1996 p. 292–6.
M. Tomlinson, A Probability Diversity Combiner for Digital H.F. Transmission, Radio and Electronic Engineer, vol. 46, No. 11, Nov., 1976, pp. 527–532.

* cited by examiner

*Primary Examiner*—John Barlow
*Assistant Examiner*—Tung S Lau
(74) *Attorney, Agent, or Firm*—Louis J. Percello; David Aker

(57) ABSTRACT

The present invention provides an apparatus and a method for determining a pulse position for a signal encoded by a pulse modulation. The signal being receivable as at least a first component (PCS) and a second component (DCS). A first storage unit (102) stores at least one symbol of the first component (PCS) and a second storage unit (104) at least one symbol of the second component (DCS). A determination unit (118) comprises a probability table (110), which in case that the first and second components (PCS, DCS) are received is addressed with the at least one symbol of the first component (PCS) and the at least one symbol of the second component (DCS). Thereby, the probability table (110) provides a value that is defined as the pulse position (DDS).

26 Claims, 12 Drawing Sheets

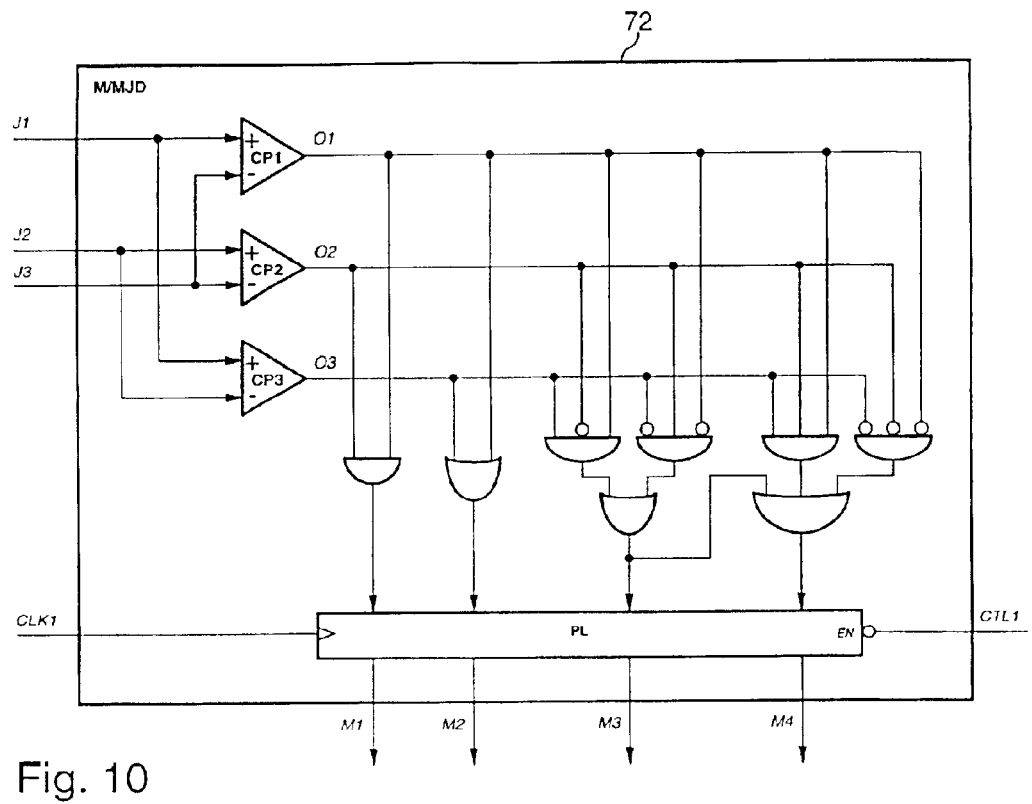
Fig. 10
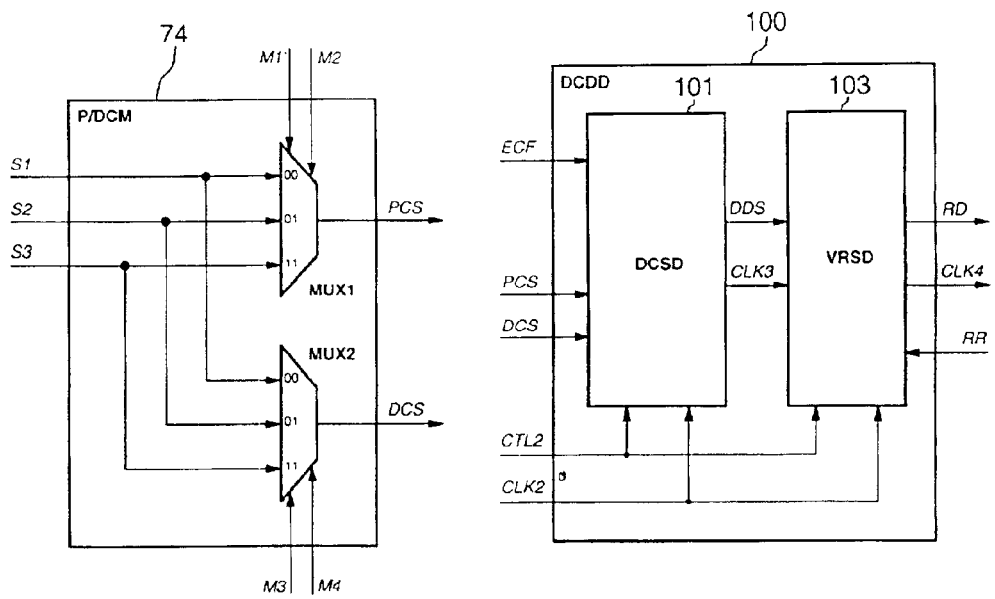
Fig. 11
Fig. 12

Fig. 17

| ROM_0 | PCS = {L1p, L2p, L3p, L4p} ⇔ {0,0,0,0} = 0, {0,0,0,1} = 1, ... , {1,1,1,1} = 15 | | | | | | | | | | | | | | | |
|---|---|---|---|---|---|---|---|---|---|---|---|---|---|---|---|---|
| DCS = {L1d, L2d, L3d, L4d} ⇔ {0,0,0,0} = 0, {0,0,0,1} = 1, ... , {1,1,1,1} = 15 | 0 | 1 | 2 | 3 | 4 | 5 | 6 | 7 | 8 | 9 | 10 | 11 | 12 | 13 | 14 | 15 |
| 0 | 4 | 4 | 3 | 4 | 2 | 2 | 3 | 4 | 1 | 1 | 3 | 3 | 2 | 2 | 1 | 3 |
| 1 | 4 | 4 | 3 | 4 | 2 | 4 | 2 | 4 | 1 | 4 | 1 | 4 | 1 | 4 | 2 | 4 |
| 2 | 3 | 4 | 3 | 3 | 2 | 4 | 3 | 3 | 1 | 4 | 3 | 3 | 2 | 2 | 3 | 3 |
| 3 | 3 | 4 | 3 | 4 | 2 | 4 | 3 | 3 | 1 | 4 | 3 | 4 | 1 | 4 | 3 | 3 |
| 4 | 2 | 4 | 3 | 3 | 2 | 2 | 2 | 2 | 1 | 1 | 3 | 3 | 2 | 2 | 2 | 2 |
| 5 | 4 | 4 | 3 | 4 | 2 | 2 | 2 | 4 | 1 | 4 | 1 | 4 | 2 | 2 | 2 | 4 |
| 6 | 2 | 4 | 3 | 3 | 2 | 2 | 3 | 2 | 1 | 4 | 3 | 3 | 2 | 2 | 3 | 2 |
| 7 | 4 | 4 | 3 | 4 | 2 | 2 | 3 | 4 | 1 | 4 | 3 | 4 | 2 | 4 | 2 | 4 |
| 8 | 1 | 4 | 3 | 3 | 2 | 4 | 2 | 3 | 1 | 1 | 1 | 1 | 1 | 1 | 1 | 1 |
| 9 | 4 | 4 | 3 | 4 | 2 | 4 | 3 | 4 | 1 | 1 | 1 | 4 | 1 | 1 | 1 | 4 |
| 10 | 1 | 4 | 3 | 3 | 2 | 4 | 3 | 3 | 1 | 1 | 3 | 1 | 1 | 1 | 3 | 1 |
| 11 | 3 | 4 | 3 | 4 | 2 | 4 | 3 | 3 | 1 | 4 | 1 | 4 | 1 | 4 | 1 | 3 |
| 12 | 1 | 4 | 3 | 3 | 2 | 2 | 2 | 2 | 1 | 1 | 1 | 1 | 2 | 1 | 2 | 1 |
| 13 | 2 | 4 | 3 | 4 | 2 | 2 | 2 | 2 | 1 | 1 | 1 | 1 | 1 | 1 | 1 | 2 |
| 14 | 1 | 4 | 3 | 3 | 2 | 2 | 3 | 3 | 1 | 1 | 3 | 3 | 2 | 2 | 1 | 1 |
| 15 | 2 | 4 | 3 | 4 | 2 | 2 | 2 | 4 | 1 | 1 | 3 | 3 | 2 | 2 | 1 | 1 |

Fig. 18

| ROM_1 | PCS = {L1p, L2p, L3p, L4p} ⇔ {0,0,0,0} = 0, {0,0,0,1} = 1, ... , {1,1,1,1} = 15 | | | | | | | | | | | | | | | |
|---|---|---|---|---|---|---|---|---|---|---|---|---|---|---|---|---|
| DCS = {L1d, L2d, L3d, L4d} ⇔ {0,0,0,0} = 0, {0,0,0,1} = 1, ... , {1,1,1,1} = 15 | 0 | 1 | 2 | 3 | 4 | 5 | 6 | 7 | 8 | 9 | 10 | 11 | 12 | 13 | 14 | 15 |
| 0 | 1 | 4 | 3 | 4 | 2 | 4 | 2 | 4 | 1 | 4 | 3 | 4 | 2 | 4 | 3 | 1 |
| 1 | 4 | 4 | 3 | 4 | 2 | 4 | 3 | 4 | 1 | 4 | 3 | 4 | 2 | 4 | 1 | 4 |
| 2 | 3 | 3 | 3 | 3 | 3 | 2 | 3 | 3 | 1 | 1 | 3 | 3 | 2 | 2 | 3 | 3 |
| 3 | 4 | 4 | 3 | 4 | 4 | 4 | 3 | 4 | 1 | 4 | 3 | 4 | 2 | 4 | 3 | 4 |
| 4 | 2 | 2 | 3 | 4 | 2 | 2 | 2 | 2 | 1 | 1 | 3 | 3 | 2 | 2 | 2 | 2 |
| 5 | 4 | 4 | 2 | 4 | 2 | 2 | 2 | 4 | 1 | 4 | 3 | 4 | 2 | 2 | 2 | 4 |
| 6 | 2 | 3 | 3 | 3 | 2 | 2 | 3 | 3 | 2 | 4 | 3 | 3 | 2 | 2 | 2 | 3 |
| 7 | 4 | 4 | 3 | 4 | 2 | 4 | 3 | 4 | 4 | 4 | 3 | 3 | 2 | 2 | 2 | 4 |
| 8 | 1 | 1 | 1 | 1 | 1 | 1 | 2 | 4 | 1 | 1 | 1 | 1 | 1 | 1 | 1 | 1 |
| 9 | 4 | 4 | 1 | 4 | 1 | 4 | 4 | 4 | 1 | 1 | 1 | 1 | 1 | 1 | 1 | 1 |
| 10 | 3 | 3 | 3 | 3 | 3 | 3 | 3 | 3 | 1 | 1 | 3 | 3 | 1 | 1 | 3 | 1 |
| 11 | 4 | 4 | 3 | 4 | 3 | 4 | 3 | 3 | 1 | 1 | 3 | 3 | 1 | 4 | 3 | 3 |
| 12 | 2 | 2 | 2 | 2 | 2 | 2 | 2 | 2 | 1 | 1 | 1 | 1 | 2 | 2 | 1 | 2 |
| 13 | 4 | 4 | 2 | 4 | 2 | 2 | 2 | 2 | 1 | 1 | 1 | 4 | 2 | 2 | 1 | 2 |
| 14 | 3 | 1 | 3 | 3 | 2 | 2 | 2 | 2 | 1 | 1 | 3 | 3 | 1 | 1 | 1 | 1 |
| 15 | 1 | 4 | 3 | 4 | 2 | 4 | 3 | 4 | 1 | 1 | 3 | 2 | 2 | 2 | 1 | 1 |

APPARATUS AND METHOD FOR DETERMINING A PULSE POSITION FOR A SIGNAL ENCODED BY A PULSE MODULATION

TECHNICAL FIELD

The present invention is related to an apparatus and a method for determining a pulse position for a signal encoded by a pulse modulation.

DESCRIPTION AND DISADVANTAGES OF PRIOR ART

There are several factors that might influence the transmission of a data signal via a channel or media, e.g. via a wire, a fiber, radio frequency (RF), or infrared. Although the present invention is applicable in a broad variety of signal processing applications and is independent from the transmission channel it will be described with the focus put on an application to wireless optical communication.

Many devices and most mobile computers are equipped with wireless infrared facilities for communication links. Traditionally, infrared links have been classified according to whether they employ a directional or non-directional transmitter and receiver, and whether or not they rely upon the existence of an uninterrupted line-of-sight path between the receiver and the transmitter. At present, directed line-of-sight links, hereinafter abbreviated to LOS, are the most widely used. Because they employ directional transmitters and receivers, the path loss is minimized, and multipath distortion is usually negligible. A unit which is able to transmit and receive infrared signals is called a transceiver or transceiver module. Practical wireless infrared transceiver modules are often restricted to use one optical receiver, which might be a photodiode (PD) and one optical emitter, which might be a light emitting diode (LED).

The Infrared Data Association, abbreviated to IrDA, has developed standards for creating short-range, point-to-point, wireless infrared links for data communication between mobile devices. A further IRDA standard is "Advanced Infrared" (AIr) which introduces the possibility of multi-point connectivity with increased distance and angular range. The current implementation of the IrDA-AIr standard implies one single transceiver module with increased transmission distance and angular range (emission/reception characteristics) of up to 120 degrees, and a standard controller for handling physical layer functions and medium access control.

However, the sensitivity of such a single transceiver module is insufficient for operating under loss of LOS conditions, and the limited angular range is insufficient to provide full LOS connectivity in conference table scenarios with several mobile devices. This represents a serious drawback of mobile devices using infrared communication compared to forthcoming mobile devices with radio links, for example, as based on the "Bluetooth" standard. Network access devices using infrared links suffer from similar restrictions.

In principle, it is possible to apply weighted analog combining of the output signals from a photodiode array pointed in different directions (diversity reception) to improve angular range and signal quality. However, lumping a photodiode array with a 360 degree field-of-view into an integrated transceiver module increases cost and leads to a large component size which is difficult to place in a mobile device without obscuring the field-of-view. In addition, placing photodiodes at separate locations in a mobile device and connecting them with transmission lines is not feasible due to external noise pick-up that interferes with the weak analog signals produced by the photodiodes.

U.S. Pat. No. 5,566,022 is related to an infrared communication system. The system includes a plurality of infrared transceivers for receiving and transmitting infrared signals through the free air. A circuit determines the direction of arrival of the received signal and provides this information to a dedicated logic controller (DLC), for registration purposes and for controlling the respective infrared transmitter.

The article "Design Considerations for Broadband Indoor Infrared Wireless Communication Systems" by M. R. Pakravan and M. Kavehard in International Journal of Wireless Information Networks, Vol. 2, No. 4, 1995, discusses the effects of receiver direction and field-of-view on the channel parameters.

In the paper "Wireless Infrared Communication Links using Multi-Beam Transmitters and Imaging Receivers" by A. P. Tang, J. M. Kahn, Keang-Po Ho, of the IEEE International Conference on Communications, Jun. 23–27, 1996, Dallas, the use of imaging receivers in infrared links is analyzed.

The research report "Angle Diversity for Nondirected Wireless Infrared Communication" by J. B. Carruthers and J. M. Kahn, University of California, Berkeley, submitted to EEE Transactions on Communications, discusses practical considerations for multi-element angle-diversity systems. Unfortunately, the report does not offer a practical solution to the present problem because it is based on highly complex and costly optical receiver arrays combined with analog high-order signal selection/concentration schemes.

The article "Angle Diversity to Combat the Ambient Noise in Indoor optical Wireless Communication Systems" by R. T. Valadas, A. R. Tavares, A. M. de Oliveira Duarte, in International Journal of Wireless Information Networks, Vol. 4, No. 4, 1997, suggests theoretical approaches to estimate several signal-to-noise ratios based on the analog current of several photodiodes.

All mentioned documents describe several theoretical approaches and simulations but these give no practical solution for the known technical problems.

Since the transmission of data signals across transmission media causes phase and amplitude distortions and also noise is added, there is a call for an innovative method that improves the reception of a digital signal in a reliable and fast way.

OBJECT OF THE INVENTION

It is an object of the invention to overcome the disadvantages of the prior art.

It is another object of the present invention to provide a method and apparatus for determining a pulse position for a signal encoded by a pulse modulation.

It is still another object of the present invention to increase the effective signal-to-noise ratio (SNR) of the received signal.

It is yet another object of the present invention to achieve more reliable communication links.

It is a further object of the present invention to present a receiver system and method which provide a sufficient or even better connectivity coverage than so-far known arrangements do.

SUMMARY AND ADVANTAGES OF THE INVENTION

The invention for achieving the objects is defined in the claims. Therein an apparatus and a method for determining a pulse position for a signal encoded by a pulse modulation is defined. The signal has at least two components: a first digital signal and a second digital signal. The first digital signal is considered as the signal with the best signal quality whereas the second digital signal is considered as the signal with the second-best signal quality. These digital signals consist of symbols which represent data in the form of frames whereby each frame comprises at least a header field containing a preamble and a data field. It can be assumed that each received digital signal comprises the same data, because each signal comes from the same source, i.e. from the same transmitter. In case where the received signals originate from different transmitters it is assumed that all transmitted signals adhere to the same standardized form of frames.

This patent application is related to another patent application, entitled "APPARATUS AND METHOD FOR DETERMINING THE QUALITY OF A DIGITAL SIGNAL", filed on the same day as the instant patent application, presently assigned to the assignee of the instant application and the disclosure of which is incorporated herein by reference. The before mentioned patent application discloses a way to determine the quality of digital signals and how to select at least the signal with the best signal quality, also referred to as the primary channel signal (PCS), and the second-best signal quality, also referred to as the diversity channel signal (DCS). These signals are selected for further processing whereas, in case of three infrared channels, the worst signal is discarded. The use of only two signals is justified by the observation that in systems with line-of-sight operation at most two transceivers will detect significant signal power. For each of the selected two signals the received symbols are temporarily stored in registers or storage units. For each possible combination of correctly or incorrectly received symbols, in case of 4-PPM (four-slot Pulse Position Modulation): $2^8$=256 combinations are possible, the most-likely correct symbol is determined which bases on Bayes' probability rule. The most-likely correct symbols are stored in a memory in form of a probability table for readout. The probability table can also be implemented with discrete logic circuits that compute the most-likely correct symbols. In other words, the symbol with the largest a posterior probability is derived, representing the most-likely symbol that has been really sent, and can be used for further processing where each 4-PPM symbol represents a unique pulse position. An effective increase in the signal-to-noise ratio (SNR) of up to at least 3 dB can be realized when the pulse position is derived from at least two digital symbols.

When the probability table is an asymmetric table, preferably a diagonally asymmetric table, then the advantage occurs that the content of the table is suited for realistic conditions where we have a best and second-best digital signal. In the case that the first digital signal shows a legal symbol, i.e. the first digital signal is not distorted or influenced by noise or the noise modifies the transmitted symbol into another legal symbol, then the second digital signal, that might be distorted, has no influence on the result of the determination of the pulse position. If the quality of the first digital signal is better than the quality of the second digital signal, then the asymmetric table is best applicable. When the digital signals are of equal quality, then the asymmetric table is still applicable without much performance loss.

If the quality of two received signals is nearly identical, it would be advantageous to use a symmetric table.

Thus, a combination of two or more probability tables or even the combination of the asymmetric and symmetric table would improve the ability to determine the pulse position under various channel conditions.

It is also possible to use a probability table that has more than two dimensions. In such a case, more than two signals could be used in order to determine the pulse position.

The probability table can be stored in simple memory, such as a read only memory (ROM) and/or a random access memory (RAM).

If illegal symbols are detected by logic circuits or an extension of the probability table, then the advantage occurs that this information can be used for further transmission, e.g. to set the data rate.

When the pulse modulation is a Pulse Position Modulation (PPM), preferably a 4-PPM modulation, then the advantage occurs that the data can be transmitted in the baseband and therefore no complex modulation techniques are necessary.

DESCRIPTION OF THE DRAWINGS

Preferred embodiments of the invention are described in detail below, by way of example only, with reference to the following schematic drawings.

FIG. 10 shows a schematics of the minimum-maximum detector that compares three values, generates the control signals for a first multiplexer circuit and a second multiplexer circuit, and stores them in storage latches.

FIG. 11 shows a schematics of the diversity multiplexer for selecting the first digital signal and the second digital signal.

FIG. 12 shows the basic blocks of the dual-channel data detector with a dual-channel symbol detector and a variable-rate data detector.

FIG. 17 shows an example of a precomputed probability table holding 4-PPM symbol values.

FIG. 18 shows a further example of a precomputed probability table holding 4-PPM symbol values.

Figure 1:
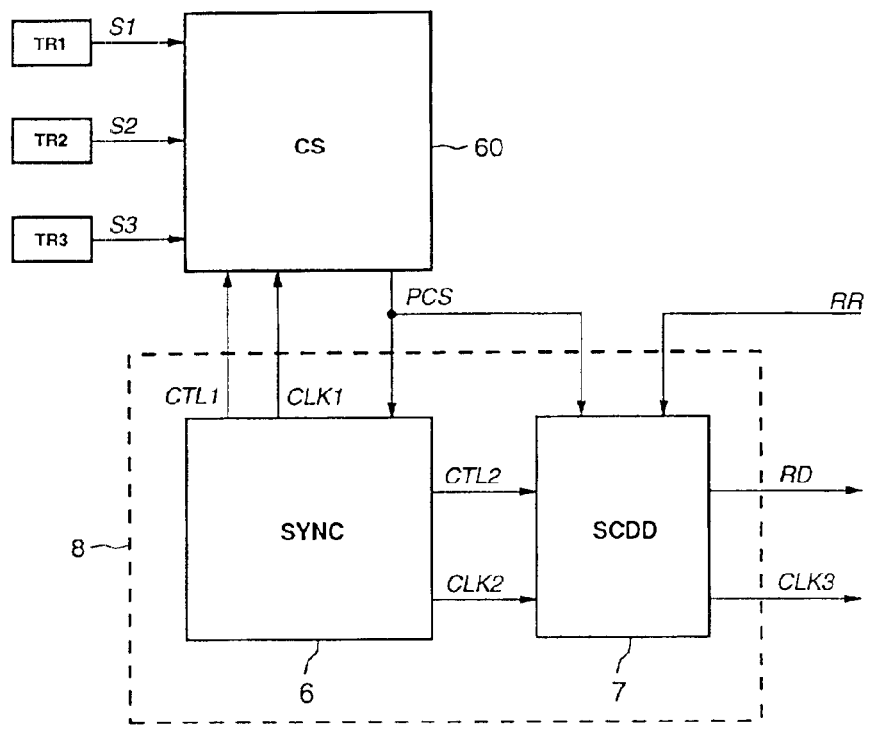
FIG. 1 shows a schematic illustration of an arrangement with three transceivers, the accompanying signals, a channel selector, and units for synchronization and data detection.

The drawings are provided for illustrative purpose only and do not necessarily represent practical examples of the present invention to scale.

DETAILED DESCRIPTION OF THE INVENTION

Although the present invention is applicable in a broad variety of signal processing applications it will be described with the focus put on an application to wireless optical communication, i.e. infrared communication. Before embodiments of the present invention are described, some basics, in accordance with the present invention, are addressed.

PPM—Pulse Position Modulation:

A Pulse Position Modulation scheme, hereinafter abbreviated to PPM, is used in accordance with the present invention. It should be noted, that other modulations schemes can be used instead, especially advantageous are pulse modulations, e.g. Run-Length Limited codes, also abbreviated to RLL. The PPM provides a variable data rate with repetition coding. L-slot Pulse Position Modulation is achieved by defining a data symbol of duration $T_D$ seconds and subsequently subdividing the symbol into a set of L, e.g., L=2, 4, 8, 16, equal time slots of duration $T_D/L$ seconds, also called 'chips'. In L-PPM schemes, only one time slot, or chip, per symbol contains a pulse, which means a logical 'one' or '1'. The other chips contain no pulse, which means a logical 'zero' or '0'. If the base is defined as L=4, then the resulting modulation scheme is called four-slot Pulse Position Modulation or 4-PPM. Because there are four unique positions within each 4-PPM symbol, four independent symbols exist in which only one chip is logically '1' while all other chips are logically '0', whereby there are the following combinations: 1000, 0100, 0010, 0001. These four symbols are the only legal data symbols allowed in 4-PPM. Each data symbol represents two bits of a single data bit pair, which are respectively 00, 01, 10, 11. Logical '1' represents a chip duration when a transmitter is emitting light, while logical '0' represents a chip duration with no light emission.

The preamble:

A digital signal represents data carried in frames, whereby each frame comprises at least a data field and a header field which contains a preamble. The preamble comprises a periodic symbol sequence to allow for initial carrier sensing, symbol clock synchronization, and chip clock phase acquisition by a phase-locked loop, also referred to as PLL. This means in particular that the preamble is employed to obtain initial relative synchronization of a digital reception- and processing-unit, which is achieved by the transmission of a periodic sequence of pulses. A receiving station which knows how many slots each symbol comprises, is able to detect after a certain while the period of the sequence of pulses. Furthermore, the receiving station adjusts its slot or chip clock phase using a PLL. The preamble comprises a plurality of repeated transmissions, preferably 128 or more, of the following legal 4-PPM symbol P: P=1000. Every other combination is possible if it is use- or helpful, e.g. for additional information transmission. After the preamble may follow a synchronization field, a control field, the data field or other fields.

In the following, a detailed description of the figures is given whereby the same reference numerals are used to denote the same or like parts. In accordance with the FIGS. 1 to 7, a way to determine the quality of a digital signal is described. This part helps to understand the present invention where the two best digital signals are applied. Several embodiments of the present invention are disclosed with reference to the FIGS. 8 to 22.

FIG. 1 shows a schematic illustration of an arrangement with three transceivers, labeled TR1, TR2, TR3, the accompanying output signals, labeled S1, S2, S3, respectively, a channel selector 60 and units for synchronization 6 and single-channel data detection 7. Each of the three transceivers delivers a binary-quantized signal to the channel selector 60 that delivers the one digital signal with the best signal quality measure, called the primary channel signal and hereafter abbreviated to PCS, to synchronization unit 6 and single-channel data detector 7. The synchronization unit 6 feeds a first control signal, hereafter abbreviated to CTL1, and a first clock signal, hereafter abbreviated to CLK1, to the channel selector 60. The synchronization unit 6 further feeds a second control signal, hereafter abbreviated to CTL2, and a second clock signal, hereafter abbreviated to CLK2, to the single-channel data detector 7. The latter outputs a received data signal, labeled RD, and a third clock signal, labeled CLK3. The single-channel data detector 7 receives as a further input a control signal, labeled RR, that carries information about the data rate reduction factor. The synchronization unit 6 and the single-channel data detector 7 are usually parts of a controller module 8 that contains further reception and transmission functions. In a further embodiment, the channel selector 60, the synchronization unit 6, and the single-channel data detector 7 can all be combined within such a controller module 8. Subsequently, the channel selector 60 and the synchronization unit 6 will be described in more detail.

Figure 1A:
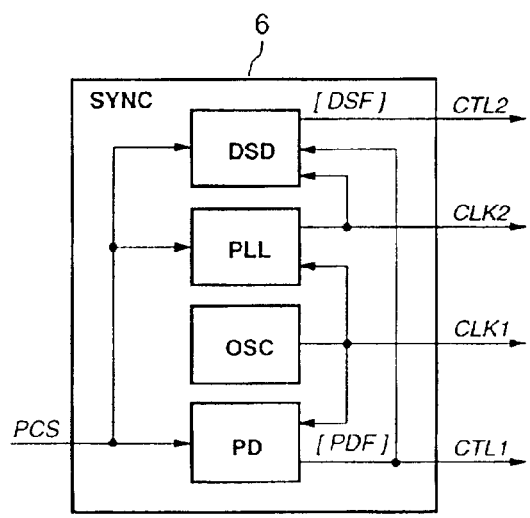
FIG. 1a shows a block diagram of the synchronization unit including a data synchronization detector, a phase-locked loop, an oscillator, and a preamble detector.

FIG. 1a shows in greater detail that the synchronization unit 6 introduced in FIG. 1 includes a data synchronization detector, labeled DSD, a phase-locked loop, labeled PLL, an oscillator, labeled OSC, and a preamble detector, labeled PD. The synchronization unit 6 has the PCS as an input and outputs control signals CTL1 and CTL2 and clock signals CLK1 and CLK2.

Figure 2:
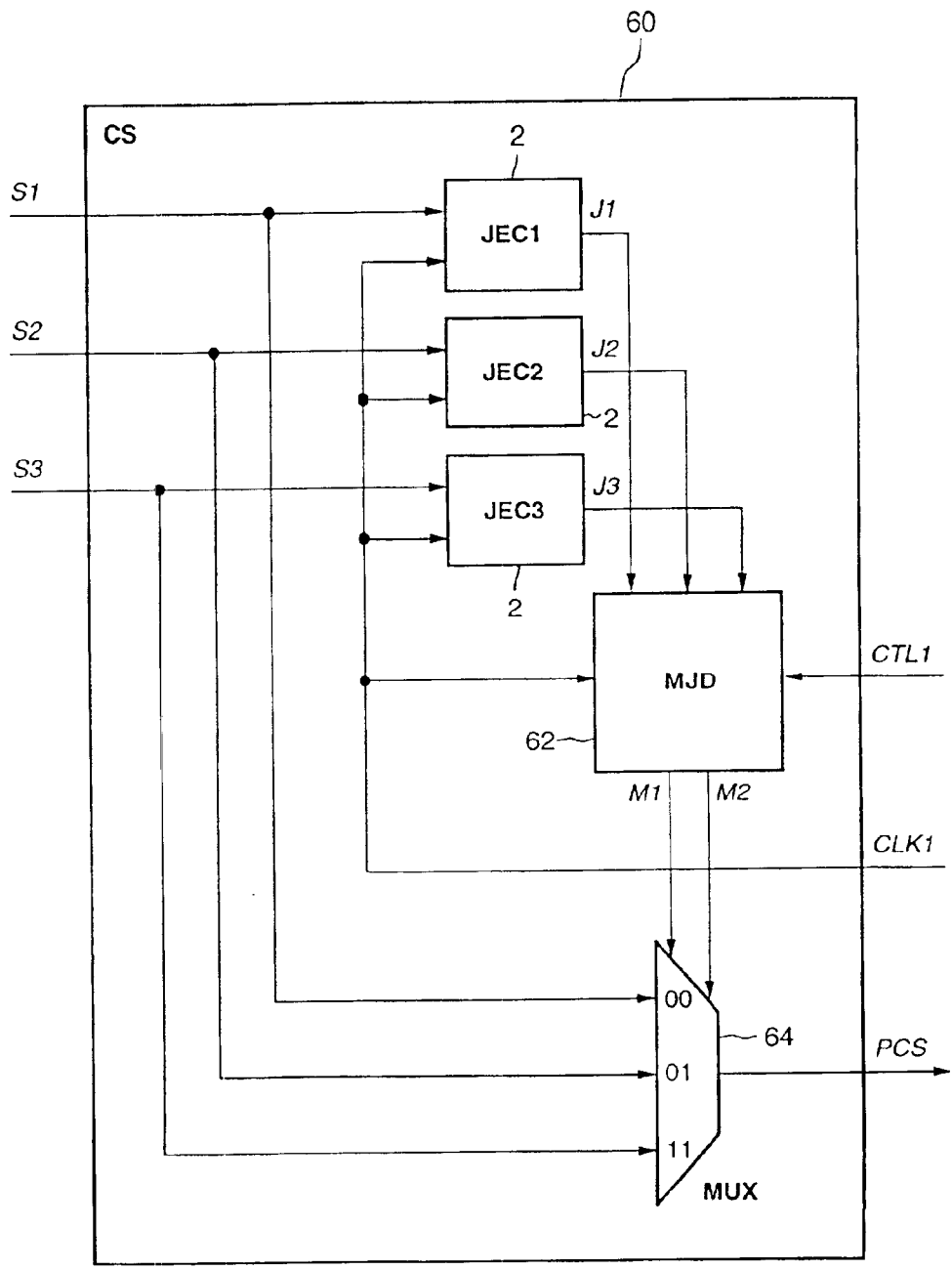
FIG. 2 shows a schematic illustration of the channel selector containing for each channel a jitter estimator, a minimum detector, and a primary multiplexer for the selection of one digital signal with the best signal quality measure.

FIG. 2 shows in more detail that the channel selector 60, also simply called selector 60, contains for each of the three channels a jitter estimator 2, a minimum detector 62, and a primary multiplexer 64 for the selection of the PCS. Each of the three jitter estimators 2 receives one binary input signal, labeled S1, S2, and S3, and outputs a channel quality measure, labeled J1, J2, and J3, respectively. These channel quality measures J1, J2, J3 are fed to and evaluated by the minimum detector 62 to generate the selection signals, labeled M1 and M2, that select the PCS at the output of the primary multiplexer 64. The three jitter estimators 2 are all driven by the clock signal CLK1 and the minimum detector 62 uses control signal CTL1 and clock signal CLK1. Subsequently, the jitter estimator 2 and the minimum detector 62 will be described in more detail.

Figure 3:
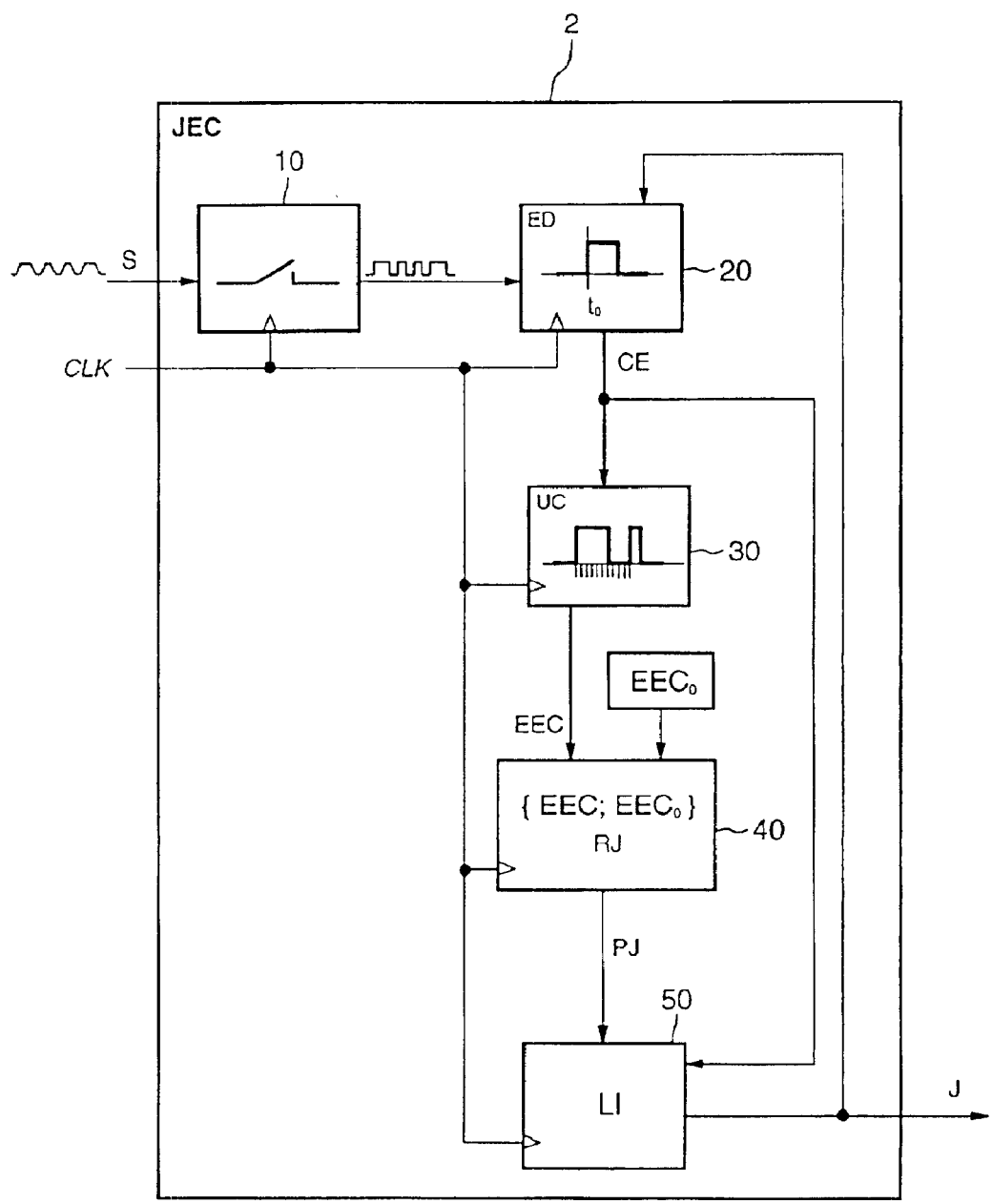
FIG. 3 shows the principal blocks of the jitter estimator including a sampler, an edge detector, a counter, a deviation detector, and a leaky integrator.

FIG. 3 shows the principal blocks of the jitter estimator 2 with a sampler 10, an edge detector 20, a counter 30, a deviation detector 40, and a leaky integrator 50. The sampler 10 uniformly samples a digital signal which is a binary-quantized input signal, labeled S, once for each cycle of the clock signal, labeled CLK, such that, for example, six samples result within the time span of a nominal 4-PPM pulse width of 125 ns. Note that the clock signal labeled CLK is also fed to the edge detector 20, the counter 30, the deviation detector 40, and the leaky integrator 50. Furthermore, the clock signal labeled CLK is identical with clock signal CLK1, the first clock signal delivered by the synchronization unit 6 shown in FIG. 1a. The sampler 10 feeds its output to the edge detector 20 which provides a state change in its output signal, labeled CE, during the one cycle of the clock signal CLK where the edge detector 20 identifies a defined edge in the samples provided by the sampler 10. The output signal CE of the edge detector 20 is fed to the counter 30 and the leaky integrator 50. Every state change in the output signal CE of the edge detector 20 that coincides with the identification of a defined edge resets the output of the counter 30, labeled EEC, to the value zero, otherwise the counter 30 increments its output by unity for each completed cycle of the clock signal CLK. The deviation detector 40 compares the output EEC of counter 30 with a prestored reference-value, labeled $EEC_o$, and determines the instantaneous deviation value $RJ=EEC-EEC_o$. The deviation detector 40 further processes the instantaneous deviation value RJ in a first step by retaining only its magnitude value |RJ| and in a second step by limiting this magnitude value to a defined maximum value $|RJ|_{MAX}$ when the magnitude value |RJ| exceeds $|RJ|_{MAX}$. Therefore, the output of the deviation detector 40, labeled PJ, is determined as PJ=|RJ| when $|RJ|<|RJ|_{MAX}$ or PJ=$|RJ|_{MAX}$ when $|RJ|>|RJ|_{MAX}$. The output PJ produced by the deviation detector 40 is identical with the input of the leaky integrator 50 whose output J provides a signal quality measure for the input signal S applied to the sampler 10. The output of the leaky integrator 50 is also fed back to the edge detector 20 to control the conditions for the detection of a defined edge. Subsequently, the edge detector 20, the deviation detector 40, and the leaky integrator 50, will be described in more detail.

Figure 4:
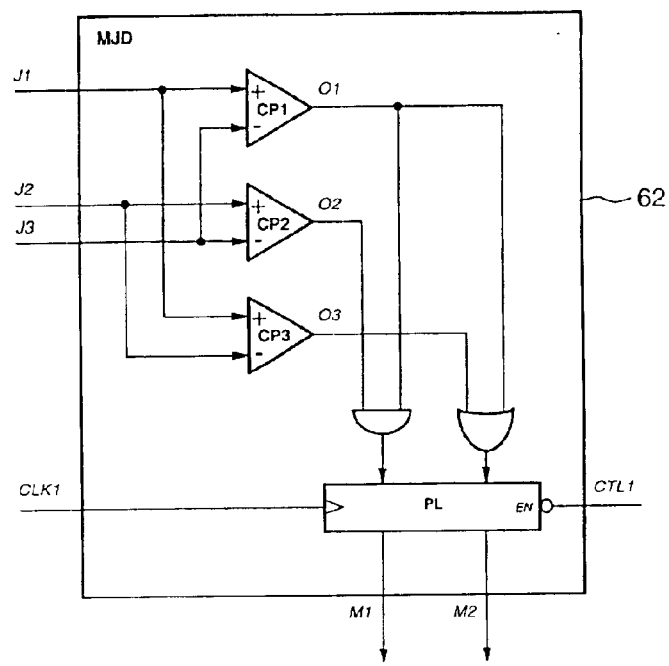
FIG. 4 shows the minimum detector that compares three values, generates the selection-signals for the primary multiplexer, and stores them in storage latches.

FIG. 4 shows in detail a minimum detector 62 that compares three input values, labeled J1, J2, and J3, by using three comparators, labeled CP1, CP2, and CP3, that assign binary values to their outputs, labeled O1, O2, and O3, respectively. From these output values the selection signals for the primary multiplexer 64, labeled M1 and M2, are then generated by using digital logic circuits and storing the selection signals in storage latches, labeled PL, that are driven by the previously defined clock signal CLK1 and control signal CTL1. Note that the output of a comparator, CP1, CP2, or CP3, is only asserted (i.e., takes on the digital logic's TRUE level) when the comparator's positive input value, labeled +, is greater than its negative input value, labeled −.

Figure 5:
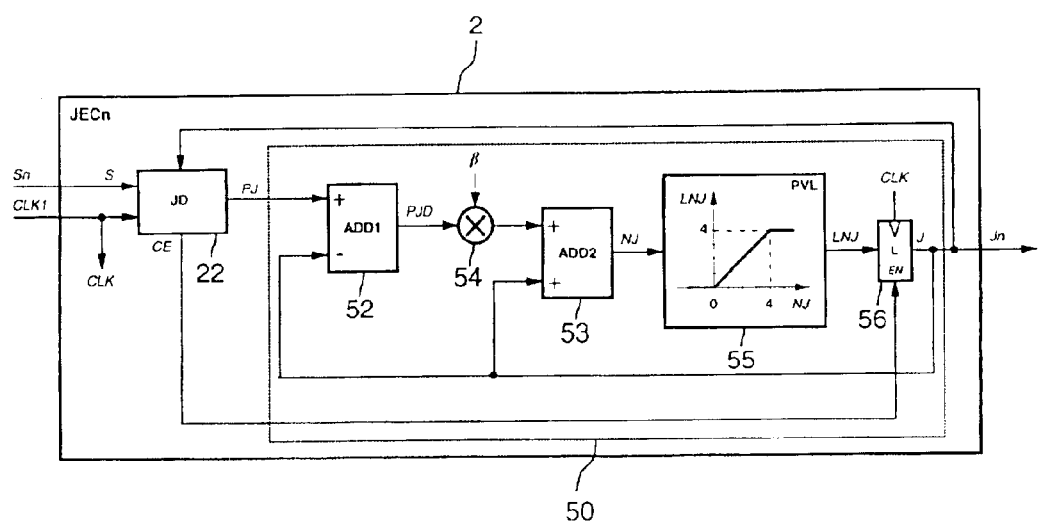
FIG. 5 shows the elements of the jitter estimator consisting of a jitter detector and the leaky integrator constructed with two adders, a leak factor multiplier, a positive value limiter, and a clocked storage latch.
Figure 6:
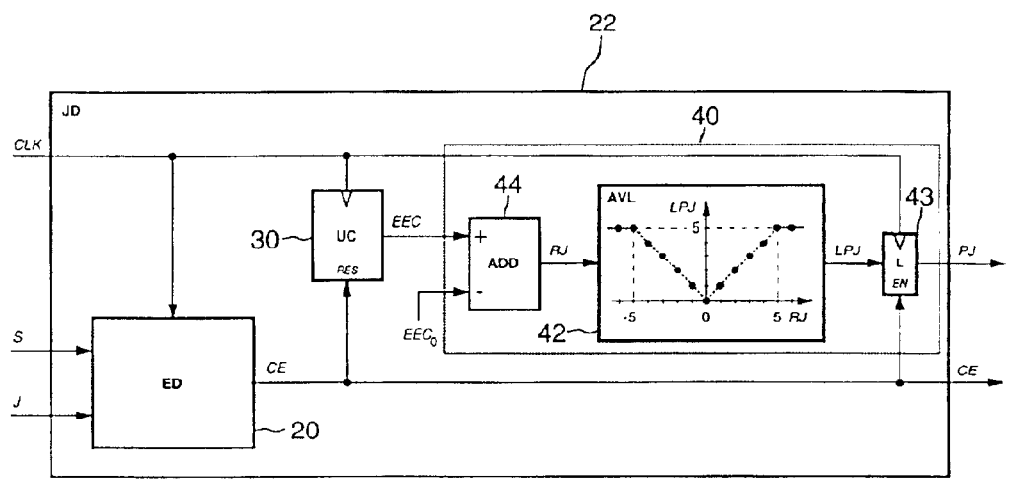
FIG. 6 shows a block diagram of the jitter detector whose output can be used to feed the leaky integrator where the jitter detector contains the edge detector, the counter, and the deviation detector comprising an adder, an absolute value limiter, and a clocked storage latch.

FIG. 5 shows the structure of the jitter estimator 2 with a jitter detector 22, described in further detail in FIG. 6, and a leaky integrator 50 that is constructed with two adders 52,53, a leak factor multiplier 54, a positive value limiter 55, and a clocked storage latch 56. The jitter estimator 2 receives a binary-quantized input signal, labeled Sn/S, together with the previously defined clock signal CLK1 that is internally labeled as CLK, and it feeds its output, labeled PJ, to the leaky integrator 50. The leaky integrator 50 operates according to the following basic equation: $J_{i+1}=(1-\beta)\times J_i+(\beta \times \Delta J_i)= J_i+\beta \times (\Delta J_i - J_i)$, where $J_i$ is some value valid at time $\tau_i$, $J_{i+1}$ is some value valid at time $\tau_{i+1}$, $\beta$ is a leak factor in the range $0<\beta \leq 1$ preferably having a power-of-two form $2^{-m}$, m=0, 1, 2, . . . , and $\Delta J_i$ is some incremental value valid at time $\tau_i$. Note that the value $J_0$, the value of $J_i$ at initialization time $\tau_0$, is typically set to the value defined as the maximum output of the positive value limiter 55; for example, $J_0=4$ according to FIG. 5 since the output of the positive value limiter, labeled LNJ, is shown to be limited to four. The signal connections between the elements of the leaky integrator 50 are defined through the following equations: Jn=J←LNJ=f(NJ) where NJ=J+β×PJD=J+β×(PJ−J), f(NJ) represents the function of the positive value limiter 55, and the variables Jn, J, LNJ, NJ, and PJD are the signal labels shown in FIG. 5. Note also that the left-directed arrow ← used in the above update equations indicates a clock-induced output update of the storage latch 56. Whether or not the clock signal labeled CLK becomes active for the storage latch 56 depends on the state of its enabling input, labeled EN, that is identical with the output of the jitter detector 22, labeled CE. Also, depending on the chosen value for β and the number of logical bits used to represent the labeled signal variables in the jitter estimator 2, the positive value limiter 55 may not be necessary; in this case LNJ=f(NJ)=NJ. Furthermore, the initial output value of the jitter estimator 2 should be loaded into the storage latch 56 at initialization time To such that, for example, Jn=J←$J_0$=4. Note that the output of the leaky integrator 50, labeled J, that provides a signal quality measure for the input signal Sn/S of the jitter estimator 2, is also fed back to the jitter detector 22 to control the conditions for the detection of a defined edge. Subsequently, the jitter detector 22 will be described in more detail.

FIG. 6 shows a detailed schematics of a jitter detector 22 as introduced in FIG. 5 whose inputs are the binary-quantized signal S, the signal quality measure J, and the clock signal CLK that is identical with the previously defined clock signal CLK1, the first clock signal delivered by the synchronization unit 6 shown in FIG. 1a. The outputs of the jitter estimator 22, labeled PJ and CE, are used by the leaky integrator 50 shown in FIG. 5. The jitter detector 22 is built with an edge detector 20 that is shown in more detail in FIG. 7, a counter 30, and a deviation detector 40 that includes an adder 44, an absolute value limiter 42, and a storage latch 43. The edge detector 20 provides a state change in its output signal, labeled CE, during the one cycle of the clock signal CLK where the edge detector 20 identifies a defined edge in the samples taken from the input signal S; the output signal CE is also fed to the counter 30 and the storage latch 43. Note that the clock signal labeled CLK is also fed to the counter 30 and the storage latch 43 within the deviation detector 40. Every state change in the output signal of the edge detector 20 that coincides with the identification of a defined edge resets the output of the counter 30, labeled EEC, to the value zero, otherwise the counter 30 increments its output by unity for each completed cycle of the clock signal CLK. The adder 44 compares the count EEC, the output of the counter 30, with a prestored reference-value, denoted $EEC_0$, and determines the instantaneous deviation value $RJ=EEC-EEC_o$. The positive value limiter 42 further processes the instantaneous deviation value RJ in a first step by retaining only its magnitude value $|RJ|$ and in a second step by limiting this magnitude value to a defined maximum value $|RJ|_{MAX}$ when the magnitude value $|RJ|$ exceeds $|RJ|_{MAX}$. Therefore, the output of the positive value limiter 42, labeled LPJ, is determined as $LPJ=|RJ|$ when $|RJ|<|RJ|_{MAX}$ or $LPJ=|RJ|_{MAX}$ when $|RJ|\geq|RJ|_{MAX}$. Note that the output PJ produced by the deviation detector 40 is identical with the output of the storage latch 43 whose input is provided by the absolute value limiter 42 in the form of its output labeled LPJ. Whether or not the clock signal labeled CLK becomes active for the storage latch 43 depends on the state of its enabling input, labeled EN, that is identical with the output CE of the edge detector 20. Subsequently, the edge detector 20 will be described in more detail.

Figure 7:
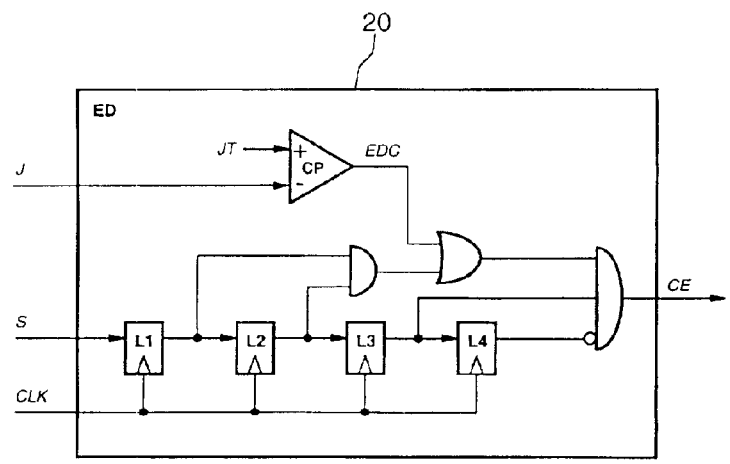
FIG. 7 shows a circuit diagram of a dual-mode edge detector that includes a comparator for edge detection control and four clocked storage latches to hold the four most recent samples of the input signal.

FIG. 7 shows a circuit diagram of the edge detector 20 which works in two modes, whose output is labeled CE, that includes a comparator, labeled CP, whose output, labeled EDC, controls the conditions for the detection of a defined edge depending on a prestored threshold value, labeled JT. The edge detector 20 also includes four storage latches, denoted L1, L2, L3, and L4, used to hold the four most recent samples of the binary-quantized input signal S. Here, the first storage latch, labeled L1, also serves as a sampler 10. Further inputs are the signal quality measure J and the clock signal CLK that drives the storage latches and is identical with the previously defined clock signal CLK1, the first clock signal delivered by the synchronization unit 6 shown in FIG. 1a. Let the stored binary contents of the storage latches Ln, n=1, 2, 3, 4, be represented by the binary variables λn, n=1, 2, 3, 4, respectively, and define the storage vector $\Gamma=[\lambda 1, \lambda 2, \lambda 3, \lambda 4]$ where $\lambda n \in \{0, 1\}$, n=1, 2, 3, 4. Assume further that the output of the edge detector 20, labeled CE, and the output of the comparator CP, labeled EDC, are both binary values from the set $\{0, 1\}$. Then, the edge detector 20 outputs CE=1, indicating the detection of a defined edge, when a) $\Gamma=[1, 1, 1, 0]$ and EDC=0 or when b) $\Gamma=[x, x, 1, 0]$ and EDC=1 where x means a don't care value; in all other cases CE=0, indicating that no defined edge has been detected. Note that EDC=1 when the inputs of the comparator CP are related as JT>J, otherwise EDC=0. It was found that the use of two different edge detection modes as explained above can improve the resolution of the channel quality measure J.

Figure 8:
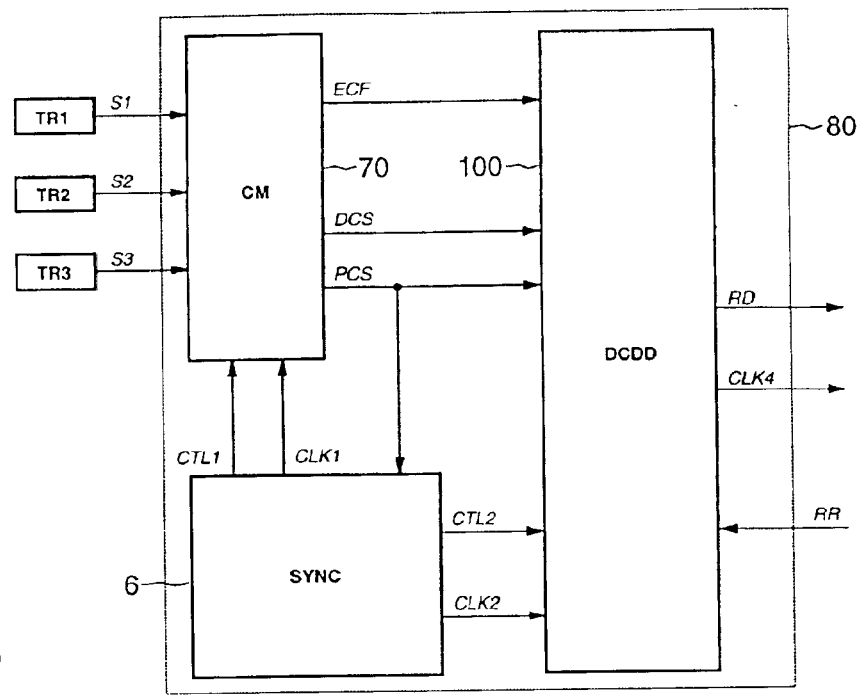
FIG. 8 shows a schematic illustration of an arrangement with three transceivers, the accompanying signals, a channel multiplexer for selecting a first digital signal and a second digital signal, the unit for synchronization, and a dual-channel data detector according to the present invention.

FIG. 8 shows a schematic illustration of an arrangement with three transceivers, labeled TR1, TR2, TR3, and the accompanying output signals, labeled S1, S2, S3, respectively, which feed a receiver system 80 that includes a channel multiplexer 70, here also simply called selector 70, a unit for synchronization 6, and a dual-channel data detector 100. Each of the three transceivers delivers a binary-quantized signal to the channel multiplexer 70 that delivers a first digital signal, called the first component or primary channel signal, hereafter abbreviated by PCS and characterized as the received signal with the best signal quality measure, and a second digital signal, called the second component or the diversity channel signal, hereafter abbreviated by DCS and characterized as the received signal with the second-best signal quality measure, for further processing by the dual-channel data detector 100. By using the PCS as well as the DCS, in contrast to a single-channel data detector 7 using only the PCS, a dual-channel data detector 100 generally achieves an improved error-rate performance. The PCS is also connected to the synchronization unit 6 which can be identical with the synchronization unit 6 that was already introduced and described in accordance with FIG. 1a. The synchronization unit 6 feeds a first control signal, hereafter abbreviated to CTL1, and a first clock signal, hereafter abbreviated to CLK1, to the channel multiplexer 70. The synchronization unit 6 further feeds a second control signal, hereafter abbreviated to CTL2, and a second clock signal, hereafter abbreviated to CLK2, to the dual-channel data detector 100; the latter receives also a further control signal from the channel multiplexer 70, labeled ECF. The dual-channel data detector 100 outputs a received data signal, labeled RD, and a fourth clock signal, labeled CLK4. The dual-channel data detector 100 receives as a further input a control signal carrying information about the data rate reduction factor, labeled RR. The synchronization unit 6 and the dual-channel data detector 100 can be parts of some controller module that contains further reception and transmission functions. In a further embodiment of the scheme disclosed in FIG. 8, the channel multiplexer 70, the synchronization unit 6, and the dual-channel data detector 100 can all be combined within such a controller module. Subsequently, the channel multiplexer 70 and the dual-channel data detector 100 will be described in more detail.

Figure 9:
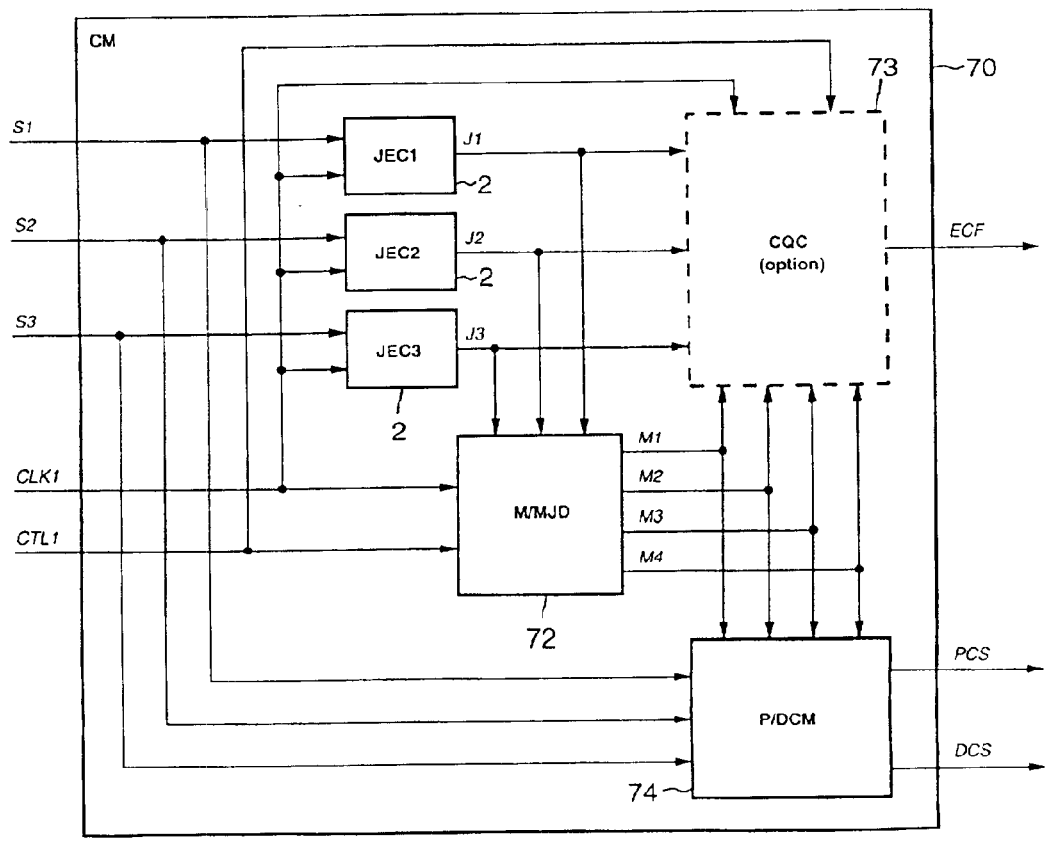
FIG. 9 shows a more detailed illustration of the channel multiplexer containing for each channel the jitter estimator, a minimum-maximum detector, a diversity multiplexer and a channel quality comparator.

FIG. 9 shows in more detail that the channel multiplexer 70 contains for each of the three channels the jitter estimator 2, a minimum-maximum detector 72, and a diversity multiplexer 74 for the selection of the PCS and the DCS. Each of the three jitter estimators 2 receives one binary input signal, labeled S1, S2, and S3, and outputs the channel quality measure, labeled J1, J2, and J3, respectively; the binary input signal S1, S2, and S3, are also connected to the diversity multiplexer 74. The channel quality measures, J1, J2, and J3, are evaluated by the minimum-maximum detector 72 to generate the selection signals M1 and M2 that select the PCS and the selection signals M3 and M4 that select the DCS at the output of the diversity multiplexer 74. The three jitter estimators 2 are all driven by the clock signal CLK1 and the minimum-maximum detector 72 uses control signal CTL1 and clock signal CLK1. Note that the jitter estimator 2 used in this scheme is identical with the jitter estimator 2 previously described in detail with reference to FIGS. 5, 6, and 7 of the present description. The channel multiplexer 70 can be enhanced with a channel quality comparator 73 that outputs the further control signal ECF and receives the clock signal CLK 1, the control signal CTL1, the channel quality measures J1, J2, and J3, and the selection signals M1, M2, M3, and M4. The further control signal ECF can be used by the dual-channel data detector 100. Subsequently, the minimum-maximum detector 72, the diversity multiplexer 74, and the-optional channel quality comparator 73, will be described in more detail.

FIG. 10 shows in detail the minimum-maximum detector 72 that compares three input values, labeled J1, J2, and J3, by using three comparators, labeled CP1, CP2, and CP3, that assign binary values to their outputs, labeled O1, O2, and O3, respectively. From these output values the selection signals for the diversity multiplexer 74, labeled M1, M2, M3, and M4, are then generated by using digital logic circuits and storing the selection signals in storage latches, labeled PL, that are driven by the previously defined clock signal CLK1 and control signal CTL1. Note that the output of a comparator CP1, CP2, or CP3, is only asserted (i.e., takes on the digital logic's TRUE level) when the comparator's positive input value, labeled +, is greater than its negative input value, labeled −.

FIG. 11 shows the schematics of the diversity multiplexer 74 with inputs labeled S1, S2, and S3, and constructed with a first multiplexer circuit, labeled MUX1, that selects the PCS based on the selection signals M1 and M2, and a second multiplexer circuit, labeled MUX2, that selects the DCS based on the selection signals M3 and M4.

FIG. 12 shows the basic blocks, as introduced in FIG. 8, of the dual-channel data detector 100 that includes a dual-channel symbol detector 101, hereinafter simply called the channel detector 101, for determining a pulse position, labeled DDS, that bases on both the PCS and the DCS applied to its inputs, and further includes a variable-rate data detector 103 designed for processing the pulse position information. In this embodiment, the pulse position determined by the channel detector 101 is that of 4-PPM symbols. The channel detector 101 supplies a third clock signal, labeled CLK3, to the variable-rate data detector 103 and it receives a further input, labeled ECF, that is provided by the channel multiplexer 70 for the selection of two different detection modes. Both, the channel detector 101 and the variable-rate data detector 103 use the clock signal CLK2 and the control signal CTL2 as provided by the synchronization unit 6. The variable-rate data detector 103 outputs a received data signal, labeled RD, and a fourth clock signal, labeled CLK4 and it receives as a further input control signal, labeled RR, that carries information about the data rate reduction factor. Subsequently, the dual-channel symbol detector 101, also simply called the channel detector 101, will be described in more detail.

Figure 13:
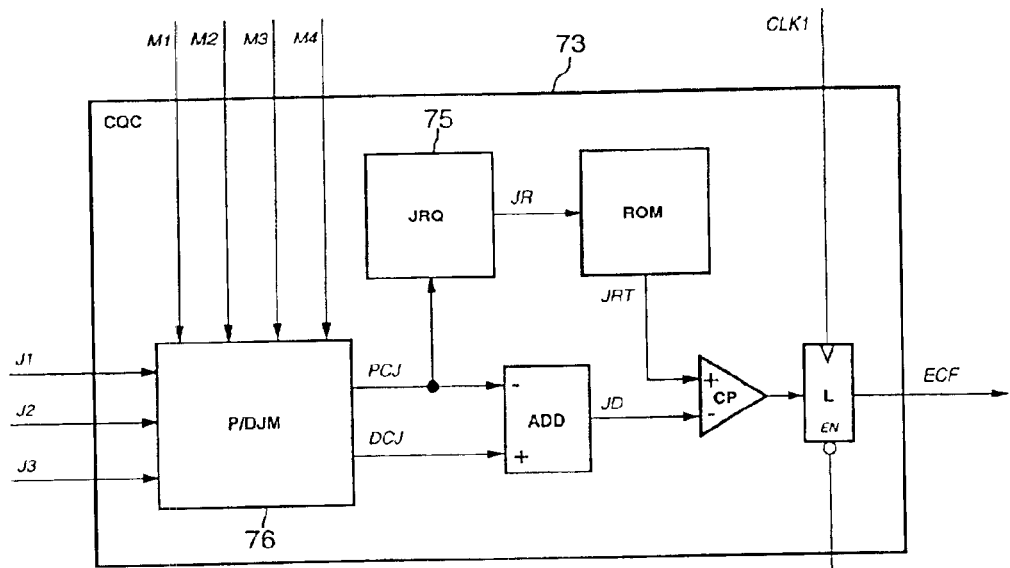
FIG. 13 shows a block diagram of the channel quality comparator with a jitter multiplexer, a jitter range quantizer, a memory unit, an adder, a comparator, and a clocked storage latch.

FIG. 13 shows the elements of the channel quality comparator 73 which includes a jitter multiplexer 76, a jitter range quantizer 75, an adder labeled ADD, a memory labeled ROM, a comparator labeled CP, and a storage latch, labeled L. The latter delivers its output signal, labeled ECF, to the channel detector 101. The jitter multiplexer 76 receives its inputs, labeled J1, J2, and J3, from the jitter estimators 2 and its selection signals, labeled M1, M2, M3, and M4, from the minimum-maximum detector 72. The jitter multiplexer 76 outputs the primary channel jitter, hereafter abbreviated to PCJ, which corresponds to the jitter contained in the PCS, and the diversity channel jitter, hereafter abbreviated to DCJ, which corresponds to the jitter contained in the DCS. Depending on the value of the PCJ, the jitter range quantizer 75 provides the address, labeled JR, for the memory ROM which then outputs a threshold value, labeled JRT. The adder ADD computes the difference JD=DCJ−PCJ and the comparator CP asserts its output when its inputs are such that JRT>JD. Depending on the value of the control signal CTL1 and the clock signal CLK1, the storage latch L stores the binary output value of the comparator CP to generate the control signal ECF.

Figure 14:
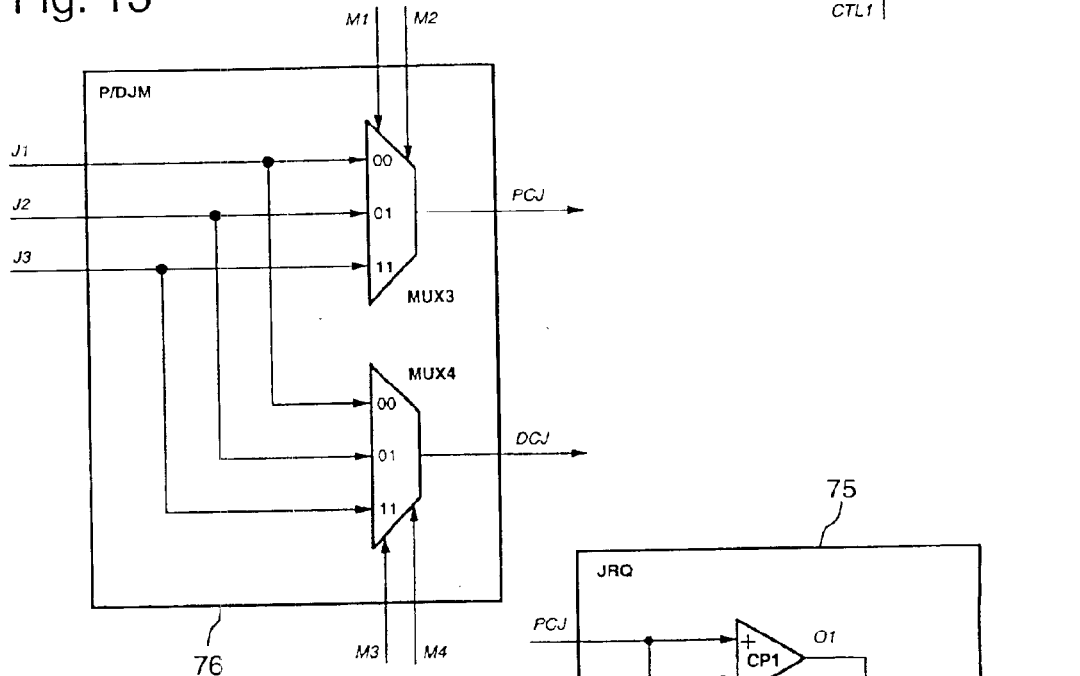
FIG. 14 shows a first and second jitter multiplexer for the selection of a first and second jitter value.

FIG. 14 shows the schematics of the jitter multiplexer 76 with inputs labeled J1, J2, and J3, and constructed with a third multiplexer circuit, labeled MUX3, that selects the PCJ based on the selection signals M1 and M2, and a fourth multiplexer circuit, labeled MUX4, that selects the DCJ based on the selection signals M3 and M4.

Figure 15:
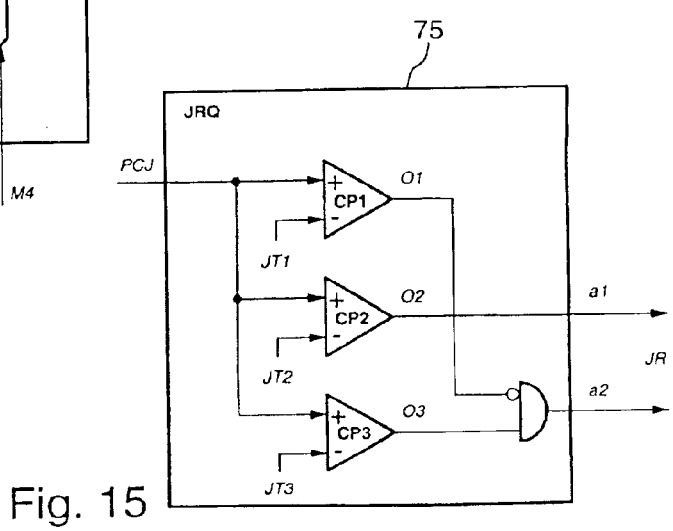
FIG. 15 shows a schematics of a jitter range quantizer with three comparators and digital logic circuits.

FIG. 15 shows in detail the jitter range quantizer 75 that derives from the PCJ input the two address bits for the memory ROM, labeled JR=(a1, a2), by using three comparators, labeled CP1, CP2, and CP3, that assign binary values to their outputs, labeled O1, O2, and O3, respectively. Note that the output of each comparator, CP1, CP2, or CP3, is only asserted (i.e., takes on the digital logic's TRUE level) when the comparator's positive input value, labeled +, is greater than the threshold, JT1, JT2, or JT3, respectively, that is applied to its negative input, labeled −.

Figure 16:
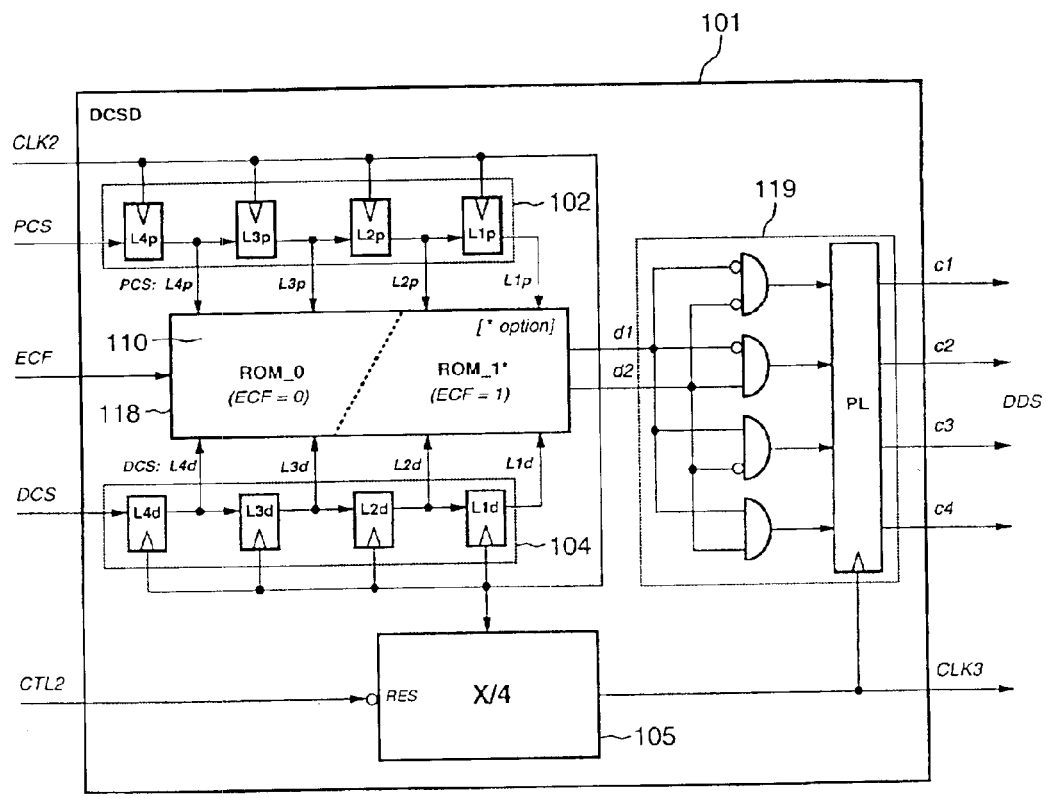
FIG. 16 shows a schematics of the dual-channel symbol detector, also simply called channel detector, with a first storage unit holding the last four samples of a first digital signal, a second storage unit holding the last four samples of a second digital signal, a determination unit with probability tables, a divide-by-four circuit, and logic circuits feeding storage latches to hold the detected pulse position.

FIG. 16 shows a schematic illustration of the channel detector 101 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS. The channel detector 101, further comprises a first storage unit 102 for storing at least one symbol of the PCS, a second storage unit 104 for storing at least one symbol of the DCS, where both storage units are driven by the earlier defined clock signal CLK2, and a determination unit 118 comprising at least one probability table 110, which in case that the PCS and the DCS are received is addressed with the at least one symbol of the PCS and the at least one symbol of the DCS, thereby providing two bits, labeled d1 and d2, at the output of the determination unit 118 that are fed to the 4-PPM symbol mapping circuit 119 to generate the pulse position DDS according to the following table:

| Outputs of determination unit 118: [d1, d2] | Pulse position for 4-PPM: DDS = [c1, c2, c3, c4] | Entry of probability table 110: # of chip with pulse |
|---|---|---|
| [0,0] | [1,0,0,0] | 1 |
| [0,1] | [0,1,0,0] | 2 |
| [1,0] | [0,0,1,0] | 3 |
| [1,1] | [0,0,0,1] | 4 |

The four bits c1, c2, c3, and c4, representing the pulse position DDS, are stored in storage latches, labeled PL, driven by a clock signal, labeled CLK3, that a divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries. A further input to the determination unit 118, labeled ECF, is provided by the channel quality comparator 73 for selecting between two different probability tables 110, labeled ROM_0 and ROM_1, to enable different detection modes; here, detection mode ROM_0 is enabled when ECF=0 and the optional detection mode ROM_1 is enabled when ECF=1. The described channel detector 101 can achieve an effective gain in terms of the signal-to-noise ratio, compared to a common single-channel data detector 7. It should be noted that the probability table 110 can also be implemented as software or with discrete logic circuits that compute the most-likely correct symbols.

FIG. 17 shows an example of the contents of the determination unit 118 in the form of the probability table 110, also labeled ROM_0. The table defines the addresses and the contents of the determination unit 118 when the control signal ECF=0. The address bits consisting of four samples of the PCS that are held, as indicated in FIG. 16, by the latches of a first storage unit 102, denoted L1p, L2p, L3p, and L4p, and four samples of the DCS that are held by the latches of a second storage unit 104, denoted L1d, L2d L3d, and L4d, are listed in the table with their decimal value where the least significant bit is as indicated in the right-most position. Each addressed table entry represents a 4-PPM symbol where the number of the entry defines the position of the symbol chip carrying the pulse, according to the 4-PPM symbol mapping rules defined in the table above. This probability table ROM_0 is an asymmetric probability table 110 which represents an asymmetric dual-channel symbol detector 101, designed under the assumption that the PCS is always of better quality than the DCS.

FIG. 18 shows another example of the contents of the determination unit 118 in the form of the probability table 110, also labeled ROM_1. The table defines the addresses and the contents of the determination unit 118 when the control signal ECF=1. The address bits consisting of four samples of the PCS that are held, as indicated in FIG. 16, by the latches of a first storage unit 102, denoted L1p, L2p, L3p, and L4p, and four samples of the DCS that are held by the latches of a second storage unit 104, denoted L1d, L2d L3d, and L4d, are listed in the table with their decimal value where the least significant bit is as indicated in the right-most position. Each addressed table entry represents a 4-PPM symbol where the number of the entry defines the position of the symbol chip carrying the pulse, according to the 4-PPM symbol mapping rules defined in the table above. This probability table ROM_1 is a symmetric probability table 110 which represents a symmetric dual-channel data detector 101, designed under the assumption that the PCS and the DCS are of equal quality.

Figure 19:
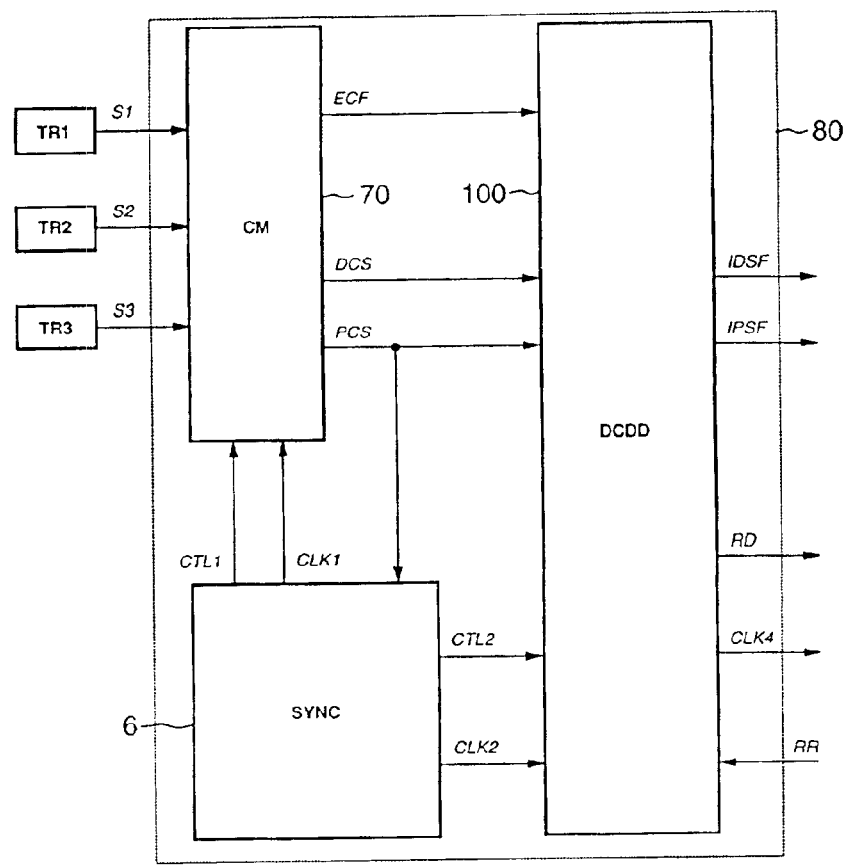
FIG. 19 shows a further schematic illustration of an arrangement with three transceivers, the accompanying signals, the channel multiplexer for selecting the first digital signal and the second digital signal, the unit for synchronization, and the dual-channel data detector.

FIG. 19 shows the same schematic illustration as in FIG. 8 of an arrangement with three transceivers, labeled TR1, TR2, TR3, and the accompanying output signals, labeled S1, S2, S3, respectively, which feed the receiver system 80 that includes the channel multiplexer 70, the unit for synchronization 6, and the dual-channel data detector 100, with the exception that the dual-channel data detector 100 in the present FIG. 19 also generates and outputs a first signaling bit, called illegal primary symbol flag and labeled IPSF, and a second signaling bit, called illegal diversity symbol flag and labeled IDSF. Ways to generate and use these additional signals will be described subsequently.

Figure 20:
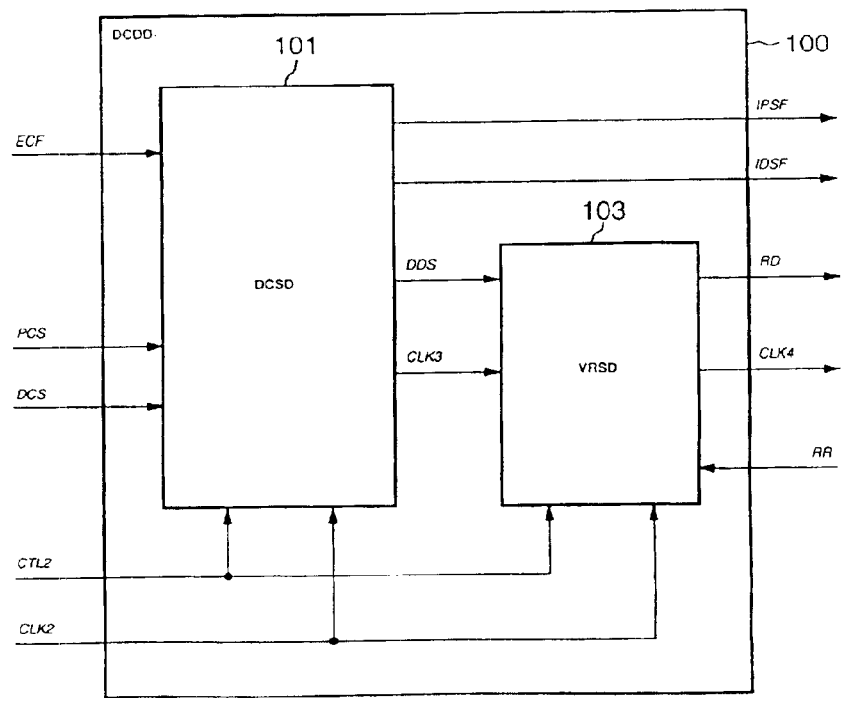
FIG. 20 shows further basic blocks of the dual-channel data detector with the dual-channel symbol detector and the variable-rate data detector.

FIG. 20 shows the same basic blocks of the dual-channel data detector 100 as in FIG. 12 that includes the channel detector 101 for determining a pulse position, labeled DDS, that bases on both the PCS and the DCS applied to its inputs, and further includes a variable-rate data detector 103 designed for processing the pulse position, with the exception that the dual-channel data detector 100 in the present FIG. 20 also generates and outputs the first signaling bit, labeled IPSF, and the second signaling bit, labeled IDSF. Ways to generate these additional signals will be described subsequently.

Figure 21:
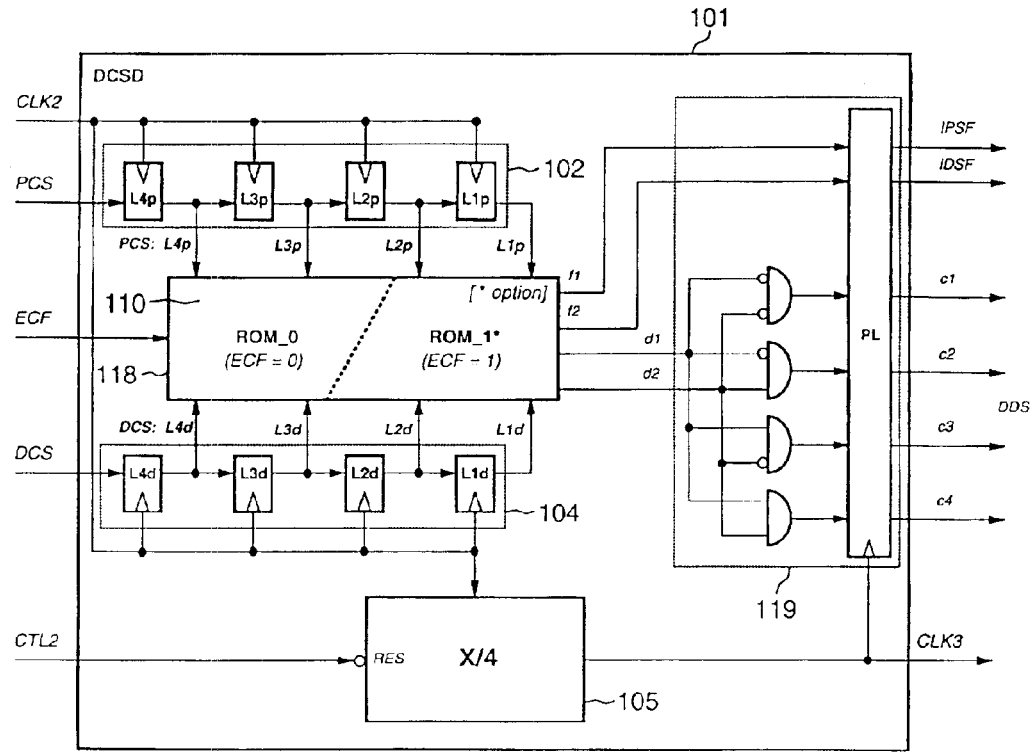
FIG. 21 shows another embodiment of the dual-channel symbol detector, where the determination unit includes additional tables of information to indicate whether the last four samples of the first digital signal form an illegal 4-PPM symbol and whether the last four samples of the second digital signal form an illegal 4-PPM symbol.
Figure 22:
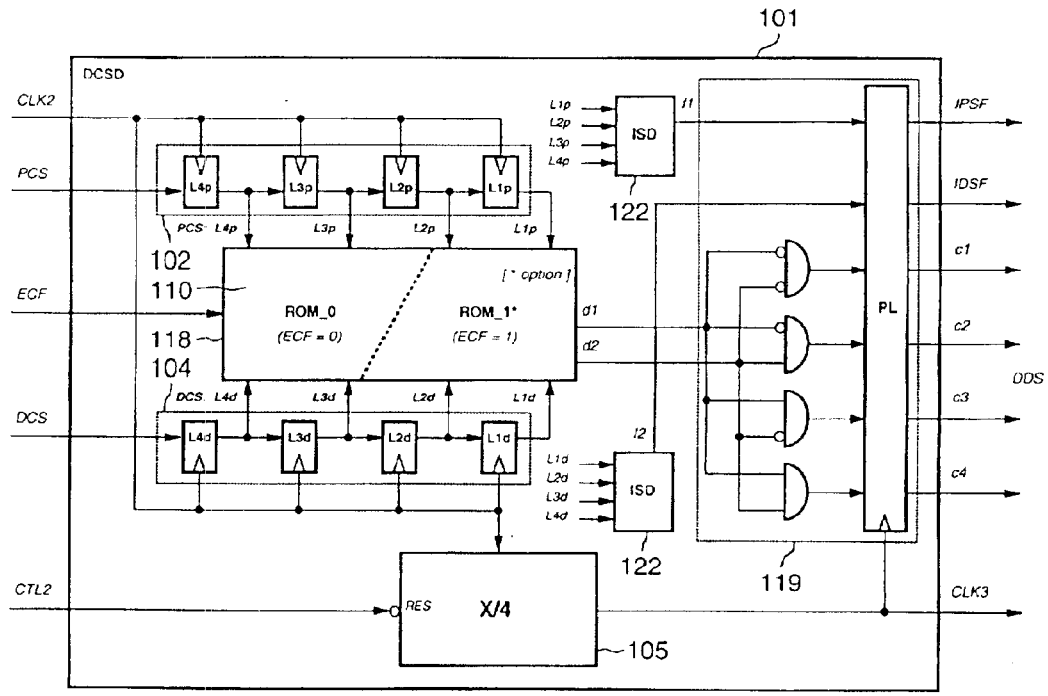
FIG. 22 shows yet another embodiment of the dual-channel symbol detector where illegal symbol detectors generate information to indicate whether the last four samples of the first digital signal form an illegal 4-PPM symbol and whether the last four samples of the second digital signal form an illegal 4-PPM symbol.

FIG. 21 shows the same schematics of the channel detector 101 as in FIG. 16 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS, with the exception that the determination unit 118 not only comprises at least one probability table 110 as introduced in accordance with FIG. 16 and described in FIG. 17, but also includes an indication table that outputs a first indication bit, labeled f1, and a second indication bit, labeled f2, respectively. The indication bits f1 and f2 can be used to derive error statistics for the PCS and the DCS, respectively, that can be used to determine an appropriate data rate reduction factor RR in a 4-PPM/variable-rate unit. For the sake of clarity, the indication table as well as the 4-PPM/variable-rate unit are not shown in FIG. 21. In case that the PCS and the DCS are received, the first indication bit f1 is only asserted (i.e., takes on the digital logic's TRUE level) when the four samples in the first storage unit 102 represent an illegal 4-PPM symbol and the second indication bit f2 is only asserted (i.e., takes on the digital logic's TRUE level) when the four samples in the second storage unit 104 represent an illegal 4-PPM symbol. Both indication bits f1 and f2 are stored in storage latches, labeled PL, driven by the clock signal, labeled CLK3, the divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries.

FIG. 22 shows again the same schematics of the channel detector 101 as in FIG. 16 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS, with the exception that the present scheme includes in addition two illegal symbol detectors 122 that here generate and output the first indication bit, labeled f1, and the second indication bit, labeled f2, respectively. In case that the PCS and the DCS are received, the first indication bit f1 is only asserted (i.e., takes on the digital logic's TRUE level) when the four samples in the first storage unit 102 represent an illegal 4-PPM symbol and the second indication bit f2 is only asserted (i.e., takes on the digital logic's TRUE level) when the four samples in the second storage unit 104 represent an illegal 4-PPM symbol. Both indication bits f1 and f2 are stored in storage latches, labeled PL, driven by a clock signal, labeled CLK3, that a divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries. As indicated above, the indication bits f1 and f2 can be used to derive error statistics for the PCS and the DCS, respectively, and allows to determine the data rate reduction factor RR.

The present invention or at least part thereof can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program in the present context means any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments. The steps herein described and claimed do not need to be executed in the given order. The steps can be carried out, at least to an extent, in any other order.

What is claimed is:

1. Apparatus for determining a pulse position for a signal encoded by pulse modulation, the signal comprising a first component and a second component, the apparatus comprising:
   a determination unit comprising a probability table for providing a value representative of the pulse position in response to receipt of at least one symbol of the first component and at least one symbol of the second component, wherein the first component is a first received signal having a first signal quality measure and the second component is a second received signal having a second signal quality measure, said probability table being an asymmetric probability table when said first signal component has a better quality measure than said second signal component, and said probability table being a symmetric probability table when said first signal component has an equal quality measure to said second signal component.

2. Apparatus according to claim 1 further comprising a first storage unit for storing at least one symbol of the first component and a second storage unit for storing at least one symbol of the second component.

3. Apparatus according to claim 1, wherein the pulse position is the most-likely pulse position.

4. Apparatus according to claim 1, wherein the probability table comprises a diagonally asymmetric table.

5. Apparatus according to claim 1, wherein the quality of the first component is better than that of the second component.

6. Apparatus according to claim 1, wherein the probability table comprises a diagonally symmetric table.

7. Apparatus according to claim 1, wherein the probability table comprises more than two dimensions.

8. Apparatus according to claim 1, wherein the probability table is storable in a memory, such as a read only memory and/or a random access memory, and wherein two or more probability tables are usable.

9. Apparatus according to claim 1, wherein the determination unit derives the pulse position by a prestored formula, preferably a probability based formula, whereby the at least one symbol of the first component and the at least one symbol of the second component represent signal values for input to the formula.

10. Apparatus according to claim 1, wherein the signal comprises an infrared signal.

11. Apparatus according to claim 1, wherein said pulse position is pulse position as function of time.

12. Apparatus according to claim 1, wherein, said probability table is a fist probability table when said first signal component has a better quality measure than said second signal component, and said probability table is a second probability table when said first signal component has an equal quality measure to said second signal component.

13. Apparatus according to claim 4, wherein in the case that the first component shows a legal symbol then the second component has no influence on the value.

14. A method for determining a pulse position for a signal encoded by a pulse modulation, the signal comprising a first component and a second component, the method comprising:
   providing, via a probability table, a value representative of the pulse position in response to receipt of at least one symbol of the first component and at least one symbol of the second component, wherein the first component is a first received signal having a first signal quality measure and the second component is a second received signal having a second signal quality measure, said probability table being an asymmetric probability table when said first signal component has a better quality measure than said second signal component and said probability table being a symmetric probability table when said first signal component has an equal quality measure to said second signal component.

15. A method according to claim 14, further comprising the steps of storing at least one symbol of the first component and storing at least one symbol of the second component.

16. A method according to claim 14, wherein said pulse position is pulse position as a function of time.

17. A computer program comprising program code means for performing, when said program is run on a computer, a method for determining a pulse position for a signal encoded by a pulse modulation, the signal comprising a first component and a second component, the method comprising:
   providing, via a probability table, a value representative of the pulse position in response to receipt of at least one symbol of the first component and at least one symbol of the second component, wherein the first component is a first received signal having a first signal quality measure and the second component is a second received signal having a second signal quality, measure, said probability table being an asymmetric probability table when said first signal component has a better quality measure than said second signal component, and said probability table being a symmetric probability table when said first signal component has an equal quality measure to said second signal component.

18. The method according to claim 17, wherein said pulse position is pulse position as a function of time.

19. A computer program product comprising program code means stored on a computer readable medium for performing, when said program is run on a computer, a method for determining a pulse position for a signal encoded by pulse modulation, the signal comprising a fist component and a second component, the method comprising:
   providing, via a probability table, a value representative of the pulse position in response to receipt of at least one symbol of the first component and at least one symbol of the second component, wherein the first component is a first received signal having a first signal quality measure and the second component is a second received signal having a second signal quality measure, said probability table being an asymmetric probability table when said first signal component has a better quality measure than said second signal component, and said probability table being a symmetric probability table when said first signal component has an equal quality measure to said second signal component.

20. The computer program product according to claim 19, wherein said pulse position is pulse position as a function of time.

21. Apparatus for determining a pulse position for a signal encoded by pulse modulation, the signal comprising a first component and a second component, the apparatus comprising:

a determination unit comprising a probability table for providing a value representative of the pulse position in response to receipt of at least one symbol of the first component and at least one symbol of the second component wherein the probability table is based on Bayes' probability.

22. Apparatus for determining a pulse position for a signal encoded by pulse modulation, the signal comprising a first component and a second component, the apparatus comprising:

a determination unit comprising a probability table for providing a value representative of the pulse position in response to receipt of at least one symbol of the first component and at least one symbol of the second component, and means for detecting an illegal symbol.

23. Apparatus according to claim 22, wherein said pulse position is pulse position as a function of time.

24. Apparatus according to claim 22, wherein the means for detecting an illegal symbol are logic circuits or an extension of the probability table.

25. Apparatus for determining a pulse position for a signal encoded by pulse modulation, the signal comprising a first component and a second component, the apparatus comprising:

a determination unit comprising a probability table for providing a value representative of the pulse position in response to receipt of at least one symbol of the first component and at least one symbol of the second component, wherein the pulse modulation comprises a four position pulse position modulation.

26. Apparatus according to claim 25, wherein said pulse position is pulse position as a function of time.

* * * * *